July 2, 1929.  F. H. STEVENSON  1,719,524
METHOD OF APPLYING COATINGS
Filed March 25, 1922
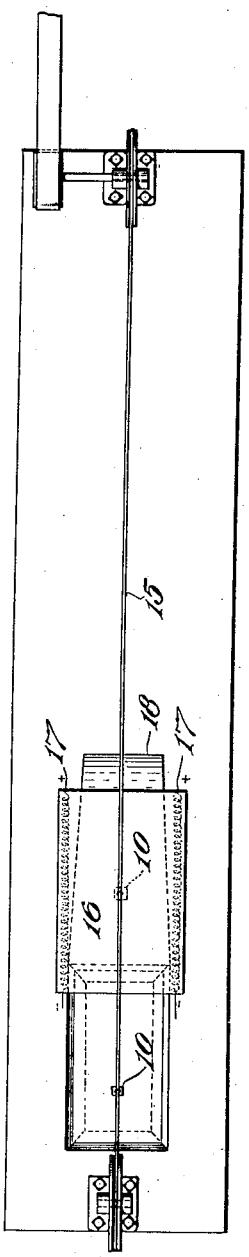
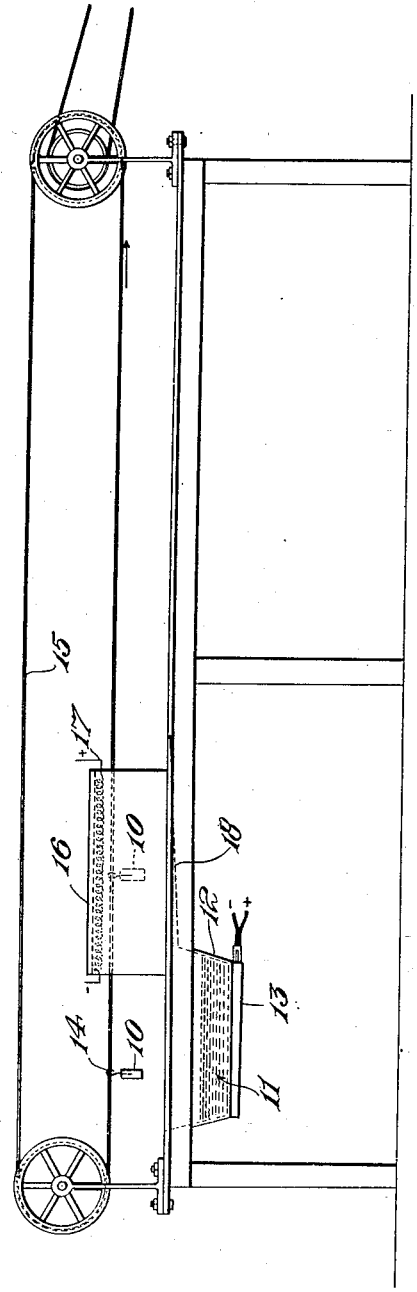

Patented July 2, 1929.

1,719,524

UNITED STATES PATENT OFFICE.

FREDERICK HENRY STEVENSON, OF PITTSBURGH, PENNSYLVANIA, ASSIGNOR TO PENNSYLVANIA CHOCOLATE COMPANY, OF PITTSBURGH, PENNSYLVANIA, A CORPORATION OF PENNSYLVANIA.

METHOD OF APPLYING COATINGS.

Application filed March 25, 1922. Serial No. 546,686.

My present invention relates to confectionery, and more particularly to the production of frozen food stuffs contained within comestible casings.

It will be understood that this invention relates, broadly, to masses or blocks of material which are adapted and intended for human consumption and that where the terms "confectionery" or "food stuffs" are used it is intended to include broadly all similar materials, which, while possibly not within the technical definition of either of these terms, are, nevertheless, intended for human consumption. Furthermore, by the term "frozen" as used in this specification, I have reference to a condition of relatively low temperature such as causes congelation of materials which are fluids at higher atmospheric temperatures.

In the production of food stuffs of the character in which an interior frozen core is maintained within an edible casing there is generally employed a process in which a block of the frozen food stuff, such as ice-cream, is dipped into a heated fluid mass of the coating composition such as one having a chocolate base. I have found that where this dipping is done rapidly, the edible chocolate casing produced thereby about the frozen block of ice-cream is generally of a thickness substantially constant for a given composition but dependent in part upon the nature of the composition regardless of the shortness in the length of time the block is permitted to be immersed in the fluid composition. This phenomenon is explained by the fact that the action of the frozen block immediately upon its immersion into the composition is to congeal the fluid immediately adjacent thereto. How rapid this action is, may be understood when it is realized that but a few degrees in temperature lie between the solid and fluid conditions of the composition to which my invention is directed in its preferred form. When, therefore, a block of frozen material, such as ice-cream, is immersed abruptly into the molten bath of the composition, it will take but a moment for the block to produce the slight lowering in the temperature of the surrounding fluid necessary to cause instant hardening of such surrounding fluid. This solidification or congelation will occur to a depth where the normal natural heat insulating characteristics of the portion of the composition thus solidified will become effective to materially reduce, if not wholly overcome, any tendency of the block enclosed thereby from acting to cause a solidification of the composition to a still further depth during the short interval of immersion.

In other words, with the like character of composition, I have found that the coating or casing produced in the manner described is generally of a substantially uniform thickness and does not vary substantially with any variation, within limits, in the length of the immersion of the block. This thickness, for purpose of convenience, will be referred to as the critical thickness, which term when used hereafter will be understood as meaning that uniform thickness which is produced when a predetermined composition is employed.

The composition which I have employed, and which is fully set forth in my application, Serial No. 537,637 filed February 18, 1922, was evolved with the purposes, among others, of the production of a casing which has the desired characteristics from the standpoint of cost of production and palatability among others. The critical thickness incident to the employment of this composition has been such that more of the composition is taken up and congealed than is necessary to give the casing its form-retaining character, with the resulting unnecessarily increased cost. Furthermore, this added quantity of the composition, e. g., when chocolate in flavor, may prove distasteful to those to whom the content of the coating is not palatable, particularly in excess quantities.

Where I have attempted to overcome these objections by varying this critical thickness of the coating by changing the character of the composition, such as by an increase of the cocoa butter components in chocolate coatings, I have found that the increase in the quantity of cocoa butter used, in addition to increasing the expense of the composition and being distasteful, has also caused the composition to have a cloying effect.

Among the more important objects of the present invention, therefore, are the provision of a frozen food product having a comestible casing of greater palatability than others known to me; the production of a generally palatable comestible casing for a frozen food substance by the employment of a composition for such casing which has the desired characteristics; the production of a comestible casing for a frozen food stuff of a thickness which is less than that normally formed by the immersion of the frozen food stuff in the fluid composition; the production of a casing so characterized effected by treatment of the article subsequent to the production thereof; the provision of an improved process for producing a casing having the desired thickness which includes the step of reducing the thickness subsequently to the production of the article; the provision of an improved process for thinning the coating of a frozen food product by means of heat; the provision of improved mechanism for attaining these ends and of the article produced by the employment of my process; and the provision of an improved apparatus and method of performing my improved process by means of said apparatus and of the control of incidents to the operation thereof adapted for the inexpensive production of a uniform product; together with such further and other objects as will hereinafter appear or be pointed out.

In the drawings, I have illustrated a preferred form of my apparatus whereby my process is employed for the production of a frozen food stuff possessing the desired characteristics.

Figure 1 is a top plan view of the apparatus, and

Figure 2 is a view in side elevation with a part in section.

In carrying out my improved process, the dipping of the blocks of ice-cream is preferably done in a closed room or chamber kept at a temperature of about 60° to 65° F., such relatively low temperature being desirably employed to prevent softening of the ice-cream, where such is employed.

As a result of this relatively low temperature, the coating on the outside of the block hardens immediately upon withdrawal from the bath of molten coating material, the portion immediately adjacent to the frozen food product having become completely solidified. Thus, as will be obvious, the quick withdrawal of the block with the casing formed thereabout may result in the casing having thereon some of the coating in only a partly solidified state but too greatly solidified to drip or drain off and the solidification of any such part will be completed by the relatively low temperature maintained in the chamber.

Upon viewing Figure 2 of the drawing, it will be observed that the block of frozen food stuff 10 is dipped into the composition 11, which is maintained in a molten state in the reservoir 12 by the electric heater indicated generally at 13.

To facilitate the dipping, a handle member 14 is inserted into the block and to obtain the best results in the shortest time, the insertion of the block 10 into the composition mass 11 and its withdrawal therefrom is performed quickly.

The block is preferably removed from this point toward a cooling room by means of the endless conveyor 15 driven in any desired or preferred manner.

The casing thus formed is of the normal or critical thickness, as already set forth. With the employment of a composition, such as that set forth in my application above referred to, this thickness is greater than that necessary to give the casing its most important primary characteristic, namely, that of form-sustaining and retaining.

For the purpose of avoiding this excess thickness of the casing and of overcoming the objections incident thereto, I have provided at some point between the dipping point and the cooling room an arrangement whereby the exterior of the casing is so treated that a ready reduction, both in the thickness of the casing and in the quantity of the material therein, may be obtained.

For the attainment of this, I cause each block 10 of the frozen food stuff coated as and in the manner described to be subjected to the action of heat to again reduce the outermost portion of the coating to a condition where such portion of the coating will assume a sufficient fluidity to drip off.

For the accomplishment of this end, I have illustrated in the drawing a tunnel 16 so arranged and constructed that the blocks 10 in their movement by the conveyor 15 are caused to pass therethrough. This tunnel 16 is maintained at a sufficiently relatively high temperature by the resistance elements 17 so as to drain off the desired percentage.

As will be understood, the percentage that is drained off in the manner above described can be made predeterminedly uniform by a predetermination of the length of the tunnel as well as its other characteristics and of the amount of heat supplied thereto and of the rate of movement of the conveyor.

This employment of the tunnel can be rendered extremely effective by giving it such special relationship to the reservoir 11 that the solidifying effect of the temperature maintained in the chamber will not be fully effective when the block reaches the tunnel.

Upon reviewing the drawing, it will be observed how closely adjacent the reservoir 11 I have positioned to the tunnel 16. By this arrangement, I have attained the further result that the drippings from the blocks 10 are drained into the reservoir 11 by means of the inclined drain boards 18.

One of the marked advantages of certain products formed by my improved process is that they may be bitten into and crushed by the teeth without cracking, which not only tends toward maintaining the desired form of the product, but also toward preventing collapse thereof, or spurting of the contents in the event of liquefaction as in the case of a core formed from ice-cream or the like.

While I have, for illustrative purposes, described my improved process in connection with an apparatus including a reservoir for fluid coating, a heated tunnel and single-strand conveyor passing therethrough for removing material dipped in such reservoir, it will be understood that my present invention also contemplates the employment of a series of parallel conveying elements, or a reticulated material of filaments such as wire or the like, forming an open-work drainage structure in the nature of a wire-cloth band to constitute the conveyor upon which blocks of ice-cream or the like may be laid preparatory to coating by an enrobing machine.

This enrobing machine may be one such as is shown and described in the French patent to Savy, and manufactured in the United States by the National Equipment Company of Springfield, Massachusetts, or may be of other suitable or desired form for associating the coating with the frozen food product by application of the coating thereto rather than by dipping the food product thereinto.

Similarly, heat may be developed at a point external of the tunnel and conveyed thereto in any convenient manner as by a fan or other conductor, or heated air may be directed immediately upon the coated blocks by means of a suitable arrangement of ducts leading from a convenient source of supply.

Having thus described my invention and illustrated its use, what I claim as new and desire to secure by Letters Patent is:—

1. The process of treating a food stuff having an edible center and a solid liquefiable coating, which includes raising the temperature about the entire exterior of the same to cause a portion of the coating thereof to assume a liquid state and remove itself from the article.

2. The process of producing food stuffs which includes the formation of a frozen confection, the application of a comestible liquefiable coating, and subjecting said coating to heat to reduce same to less than the critical thickness consequent upon the difference in thermal conditions between the interior and exterior of the confection.

3. The process of producing confectionery which includes associating a frozen core with a jacket of edible material, and immediately thereafter lowering the viscosity of the jacket for reducing its depth.

4. The process of producing confectionery which includes associating a frozen core with a coating material in a fluid state and then passing said confectionery through a heated chamber.

5. The process of producing confectionery which includes associating a frozen core with the coating material in a fluid state and immediately thereafter passing said confectionery through a heated chamber.

6. The process of producing confectionery which includes associating a frozen core with a coating material in a fluid state and then passing said confectionery through a heated area.

In testimony whereof I have hereunto signed my name.

FREDERICK HENRY STEVENSON.